United States Patent
Herman et al.

(10) Patent No.: US 11,422,101 B2
(45) Date of Patent: Aug. 23, 2022

(54) PHOTONIC QUANTUM DEW POINT SENSOR

(71) Applicant: Government of the United States of America, as represented by the Secretary of Commerce, Gaithersburg, MD (US)

(72) Inventors: Tobias K. Herman, Clarksburg, MD (US); Nikolai N. Klimov, Ellicott City, MD (US); Thomas P. Purdy, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 528 days.

(21) Appl. No.: 16/527,209

(22) Filed: Jul. 31, 2019

(65) Prior Publication Data
US 2020/0041431 A1 Feb. 6, 2020

Related U.S. Application Data

(60) Provisional application No. 62/713,109, filed on Aug. 1, 2018.

(51) Int. Cl.
*G01N 25/68* (2006.01)
*G01N 21/17* (2006.01)
(52) U.S. Cl.
CPC ..... *G01N 25/68* (2013.01); *G01N 2021/1723* (2013.01); *G01N 2021/1731* (2013.01); *G01N 2021/1763* (2013.01)
(58) Field of Classification Search
CPC ........... G01N 25/68; G01N 2021/1731; G01N 2021/1723; G01N 2021/1763
See application file for complete search history.

(56) References Cited

U.S. PATENT DOCUMENTS

| 4,392,362 | A |   | 7/1983 | Little |
| 6,164,817 | A | * | 12/2000 | Trainer ................ G01N 25/68 374/18 |

(Continued)

FOREIGN PATENT DOCUMENTS

| EP | 2444769 A1 | 4/2012 |
| WO | 2016190816 A1 | 12/2016 |

OTHER PUBLICATIONS

Purdy, T.P., et al., "Quantum correlations from a room-temperature optomechanical cavity", Science, 2017, 1265-1268, vol. 356.

(Continued)

*Primary Examiner* — Paul M. West
(74) *Attorney, Agent, or Firm* — Office of Chief Counsel for National Institute of Standards and Technology

(57) ABSTRACT

A photonic quantum dew point sensor determines a dew point of an analyte and includes a common substrate; a photonic dew sensor on the common substrate and exposed for direct contact with the analyte; a photonic temperature sensor on the common substrate; an optomechanical temperature sensor on the common substrate; a dew sensor substrate interposed between the photonic dew sensor and the common substrate; a heater on the dew sensor substrate proximate to the photonic dew sensor; a temperature sensor substrate interposed between the common substrate and each of the photonic temperature sensor and the optomechanical temperature sensor; and a sensor cover on the photonic temperature sensor, the optomechanical temperature sensor, and the temperature sensor substrate to cover the photonic temperature sensor and the optomechanical temperature sensor to prevent direct contact between the analyte and each of the photonic temperature sensor and the optomechanical temperature sensor.

20 Claims, 14 Drawing Sheets

(56) References Cited

U.S. PATENT DOCUMENTS

| | | |
|---|---|---|
| 9,726,553 B2 | 8/2017 | Ahmed et al. |
| 2013/0248167 A1 | 9/2013 | Lerou |
| 2018/0164236 A1 | 6/2018 | Tao et al. |

OTHER PUBLICATIONS

Tao, J., et al., "An Ultrahigh-accuracy Miniature Dew Point Sensor based on an Integrated Photonics Platform", Nature Scientific Reports, 2016.

Limodehi, H.E., et al., "Fiber optic humidity sensor using water vapor condensation", Optics Express, 2017, 15313, vol. 25 No. 13.

Mathew, J., et al., "Photonic Crystal Fiber Interferometer for Dew Detection", Journal of Lightwave Technology, 2012, 1150-1155, vol. 30 No.8.

Ascorbe, J., et al., "Recent Deveopments in Fiber Optics Humidity Sensors", Sensors, 2017, 893, vol. 17.

Kolpakov, S.A,. et al., "Toward a New Generation of Photonic Humidity Sensors", Sensors, 2014, 3986-4013, vol. 14.

Nie, J., et al., "Dew point measurement using dual quartz crystal resonator sensor", Sensors and Actuators B Chemical, 2017, 792-799, vol. 246.

Jachowicz, R.S., et al., "A MEMS-based super fast dew point hygrometer-construction ans medical applications", Measurement Science and Technology, 2009, 124008, vol. 20.

Fenner, R., et al., "Micromachined Water Vapor Sensors: A Review of Sensing Technologies", IEEE Sensors Journal, 2001, 309-317, vol. 1 No. 4.

Derking, J.H., et al., "A miniature Joule-Thomson cooler for optical detectors in space", Review of Scientific nstruments, 2012, 045117, vol. 83.

Tao, J., et al., "A Novel Photonic Dew-Point Hygrometer with Ultra-High Accuracy", IEEE, 2016, 893-896.

Purdy, T.P., et al., "Observation of Optomechanical Quantum Correlations at Room Temperature", 2016, DOI: arXiv:1605.05664.

Purdy, T.P., et al., "Thermometry with Optomechanical Cavities", Optical Society of America, 2016.

\* cited by examiner (A)

(B)

(E)

(C)

(F)

(D)

PHOTONIC QUANTUM DEW POINT SENSOR

CROSS REFERENCE TO RELATED APPLICATIONS

The application claims priority to U.S. Provisional Patent Application Ser. No. 62/713,109 filed Aug. 1, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 18-057US1.

BRIEF DESCRIPTION

Disclosed is a photonic quantum dew point sensor for determining a dew point of an analyte, the photonic quantum dew point sensor comprising: a common substrate; a photonic dew sensor disposed on the common substrate and exposed for direct contact with the analyte; a photonic temperature sensor disposed on the common substrate; an optomechanical temperature sensor disposed on the common substrate; a dew sensor substrate disposed on the common substrate and interposed between the photonic dew sensor and the common substrate; a heater disposed on the dew sensor substrate proximate to the photonic dew sensor to heat the photonic dew sensor above a dew point of the analyte; a temperature sensor substrate disposed on the common substrate and interposed between the common substrate and each of the photonic temperature sensor and the optomechanical temperature sensor; and a sensor cover disposed on the photonic temperature sensor, the optomechanical temperature sensor, and the temperature sensor substrate to cover the photonic temperature sensor and the optomechanical temperature sensor to prevent direct contact between the analyte and each of the photonic temperature sensor and the optomechanical temperature sensor.

Disclosed is a relative humidity sensor comprising: a photonic quantum dew point sensor; and a secondary temperature sensor in communication with the photonic quantum dew point sensor.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

Some conventional transducers measure a property such as capacitance across a membrane or resistance of a material in which the response of the conventional transducer changes with humidity but such response depends on a material property of a sensing element that changes with time or environmental history so that the conventional transducer involves frequent calibration. Moreover, a conventional dew point hygrometer directly measures dew point at a humidity and moisture rather than a moisture sensitive property of a material, and the conventional dew point hygrometer directly probes thermodynamics of water vapor so that when the conventional dew point hygrometer is clean, the conventional dew point hygrometer provides a measurement of dew point that depends on an accuracy and stability of an embedded temperature sensor. A conventional chilled mirror dew point hygrometer measures reflection of light off a chilled metal mirror that involves a bulky and expensive instrument and having mirrors that are relatively large metal structures for thermal contact with an internal temperature probes but that disadvantageously have a slow thermal time constant that takes over a minute or longer to stabilize at a new dew point if humidity changes.

It has been discovered that a photonic quantum dew point sensor described herein overcomes technical limitation of conventional apparatus in determination of a dew point of an analyte. Moreover, the photonic quantum dew point sensor includes a quantum temperature standard that provides zero chain traceability to a photonic dew point sensor and eliminates a future calibration. The photonic quantum dew point sensor directly measures dew point that overcomes conventional transducers measure of humidity-dependent behavior that involves frequent calibration. The photonic quantum dew point sensor can have a scalable size, and a selected size of the photonic quantum dew point sensor can be miniature with a size of about 1 cm$^3$, including micron-sized sensing elements, that combine fast response speed, highly sensitive response, precision, and stability greater than conventional apparatus such as a chilled mirror dew point hygrometer. The photonic quantum dew point sensor provides rapid changes in temperature of an optical sensor at a low frost point, e.g., less than −50° C., and determination of a dew point in seconds instead of tens of minutes. The photonic quantum dew point sensor determines dew point for a frost point temperatures as low as −100° C. in an absence of a bulky refrigeration system present in conventional chilled mirror hygrometers. The photonic quantum dew point sensor also has sub-second readout speed with high precision, e.g., greater than 1 milliKelvin (mK) to 10 mK.

Figure 1:
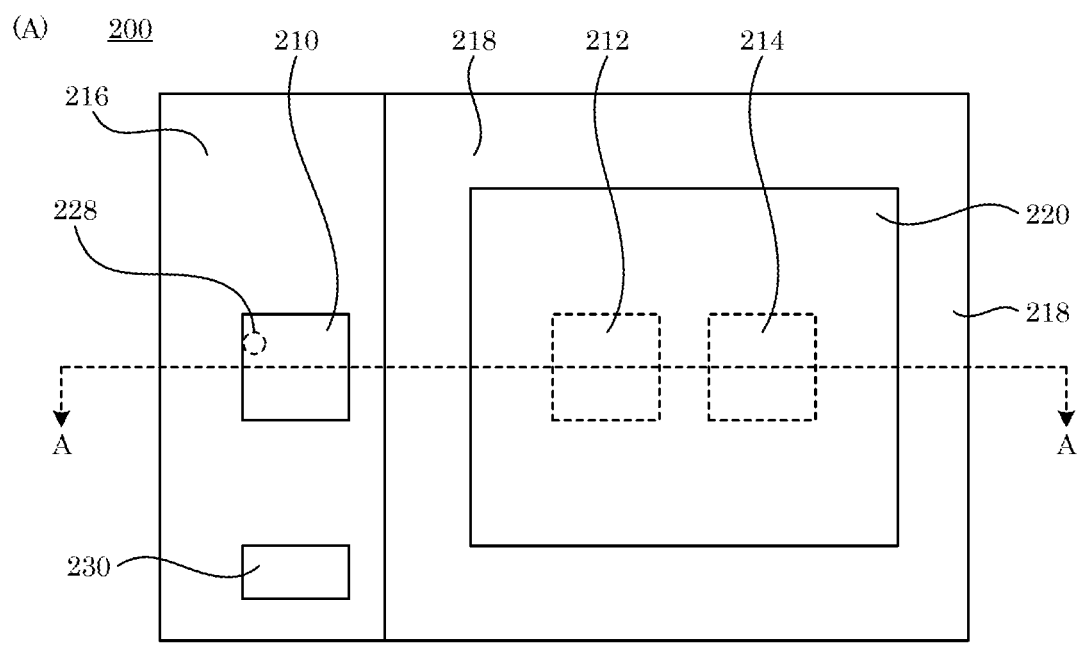
FIG. 1 shows, in panel A, a plan view of a photonic quantum dew point sensor; in panel B, a cross-section along line A-A of the photonic quantum dew point sensor shown in panel A that includes a cover in direct contact with a temperature sensor; and in panel C, a cross-section along line A-A of the photonic quantum dew point sensor shown in panel A that includes a cavity between a cover and a temperature sensor.
Figure 1:
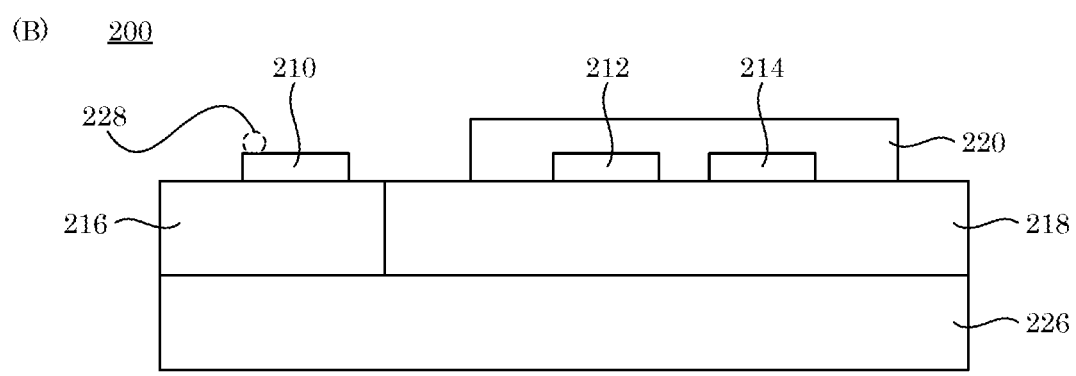
Figure 1:
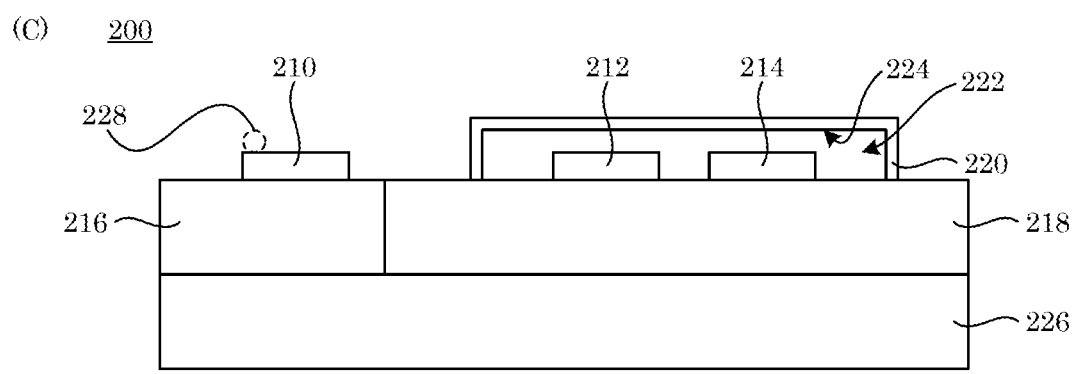

Photonic quantum dew point sensor 200 determines a dew point of analyte 228. In an embodiment, with reference to FIG. 1, photonic quantum dew point sensor 200 includes common substrate 226; photonic dew sensor 210 disposed on common substrate 226 and exposed for direct contact with analyte 228; photonic temperature sensor 212 disposed on common substrate 226; optomechanical temperature sensor 214 disposed on common substrate 226; dew sensor substrate 216 disposed on common substrate 226 and interposed between photonic dew sensor 210 and common substrate 226; heater 230 disposed on dew sensor substrate 216 proximate to photonic dew sensor 210 to heat photonic dew sensor 210 above a dew point of analyte 228; temperature sensor substrate 218 disposed on common substrate 226 and interposed between common substrate 226 and each of photonic temperature sensor 212 and optomechanical temperature sensor 214; and sensor cover 220 disposed on photonic temperature sensor 212, optomechanical temperature sensor 214, and temperature sensor substrate 218 to cover photonic temperature sensor 212 and optomechanical temperature sensor 214 to prevent direct contact between analyte 228 and each of photonic temperature sensor 212 and optomechanical temperature sensor 214. It should be appreciated that analyte 228 can directly contact photonic dew sensor 210. But, due to presence of sensor cover 220 disposed on photonic temperature sensor 212 and optomechanical temperature sensor 214, analyte 228 cannot not directly contact photonic temperature sensor 212 and cannot directly contact optomechanical temperature sensor 214.

Figure 2:
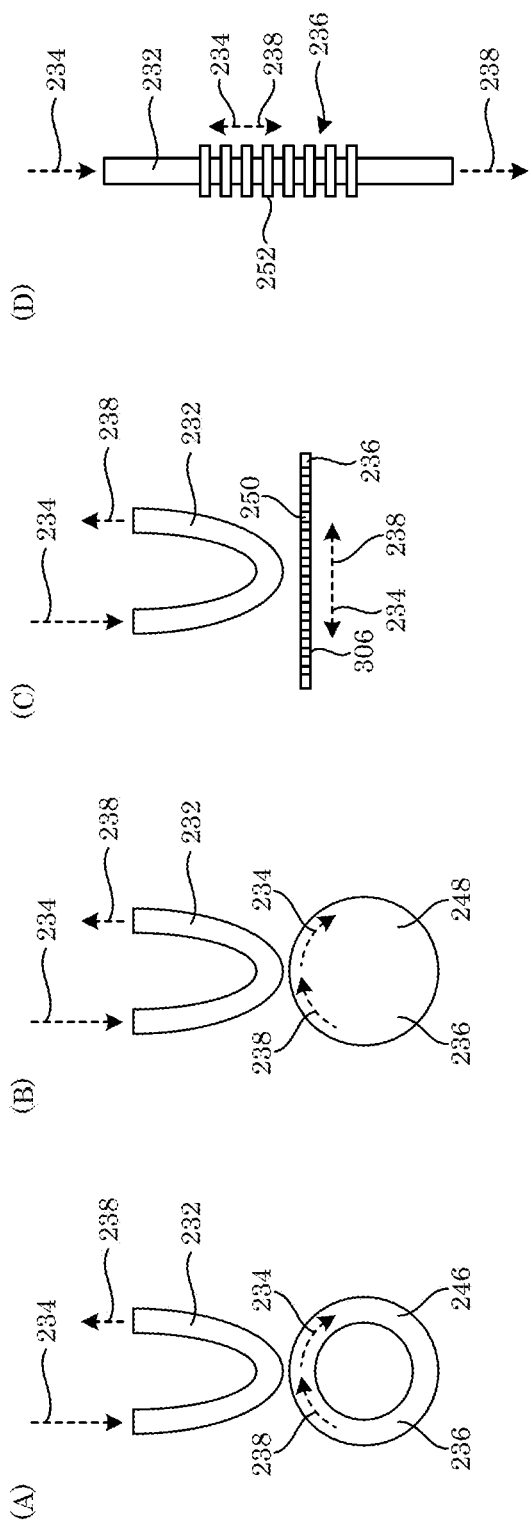
FIG. 2 shows a waveguide in optical communication with a ring resonator in panel A, a disk resonator in panel B, a photonic crystal in panel C, and a Bragg waveguide in panel D.

In an embodiment, with reference to FIG. 2, photonic dew sensor 210 and photonic temperature sensor 212 independently includes waveguide 232. It is contemplated that waveguide 232 receives primary light 234; communicates primary light 234 to resonator 236; receives output light 238 from resonator 236; and communicates output light 238 therefrom. In an embodiment, resonator 236 is in optical communication with waveguide 232 and receives primary light 234 from waveguide 232; produces output light 238 from primary light 234; and communicates output light 238 to waveguide 232. An intensity of output light 238 is substantially lower than an intensity of primary light 234 when a wavelength of output light 238 is at a resonance of resonator 236, e.g., as shown in panel A of FIG. 9. According to an embodiment, resonator 236 includes ring resonator 246 (panel A, FIG. 2), disk resonator 248 (panel B, FIG. 2), photonic crystal 250 (panel C, FIG. 2), or Bragg waveguide 252 (panel D, FIG. 2).

Figure 3:
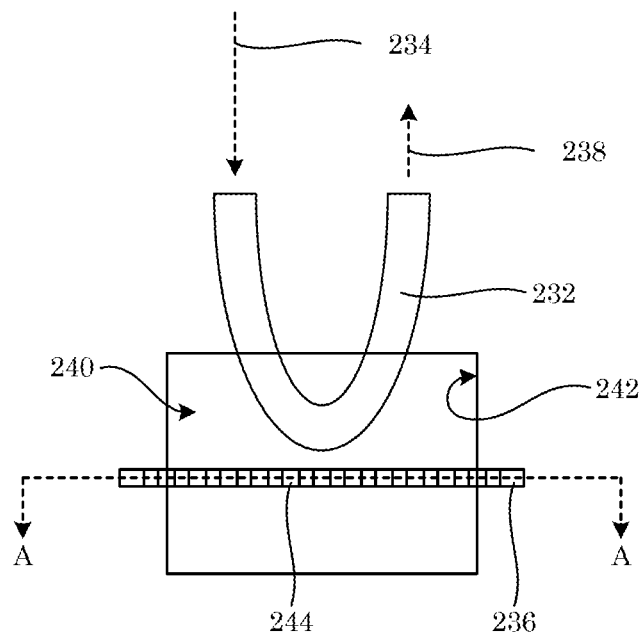
FIG. 3 shows a waveguide in optical communication with a photonic nanobeam disposed over a trench.
Figure 3:
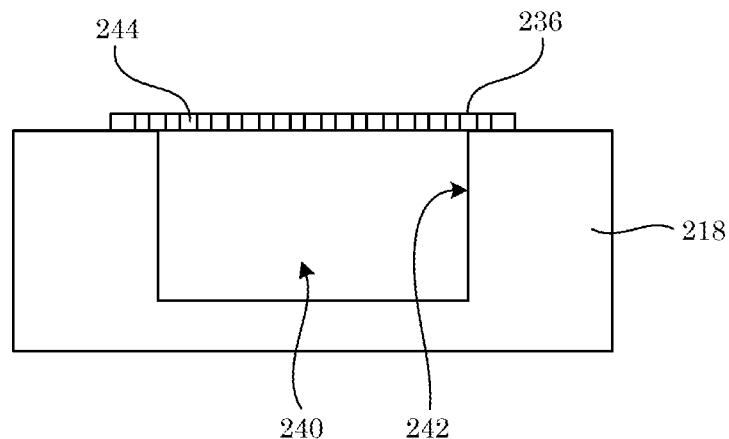

In an embodiment, with reference to FIG. 3, optomechanical temperature sensor 214 includes waveguide 232 that receives primary light 234; communicates primary light 234 to resonator 236; receives output light 238 from resonator 236; and communicates output light 238 therefrom. Optomechanical temperature sensor 214 also includes resonator 236 in optical communication with waveguide 232. Resonator 236 receives primary light 234 from waveguide 232; produces output light 238 from primary light 234; and communicates output light 238 to waveguide 232. An intensity of output light 238 is substantially lower than an intensity of primary light 234 when a wavelength of output light 238 is at a resonance of resonator 236, e.g., as shown in panel A of FIG. 9. According to an embodiment, resonator 236 includes photonic nanobeam 244 disposed over trench 240, wherein trench 240 is disposed in temperature sensor substrate 218 and bounded by wall 242 of temperature sensor substrate 218.

Figure 4:
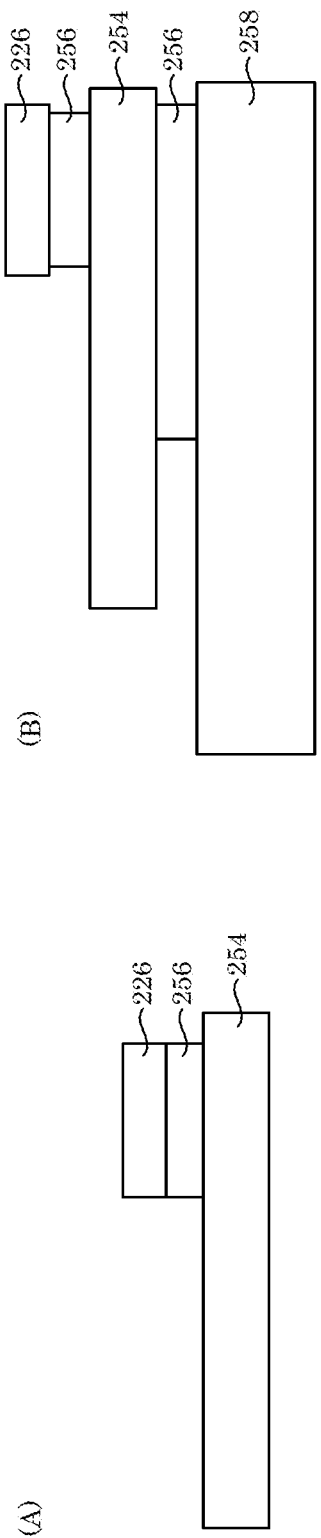
FIG. 4 shows a dew sensor substrate disposed on a thermoelectric member in panel A and a cooling member in panel B.

In an embodiment, with reference to FIG. 4, photonic quantum dew point sensor 200 includes thermoelectric member 254 disposed on dew sensor substrate 216, as shown in panel A. In some embodiments, photonic quantum dew point sensor 200 further includes thermal conductor 256 interposed between dew sensor substrate 216 and thermoelectric member 254. Photonic quantum dew point sensor 200 can include cooling member 258 disposed on thermoelectric member 254, wherein a second thermal conductor 256 is interposed between cooling member 258 and thermoelectric member 254, as shown in panel B.

Figure 5:
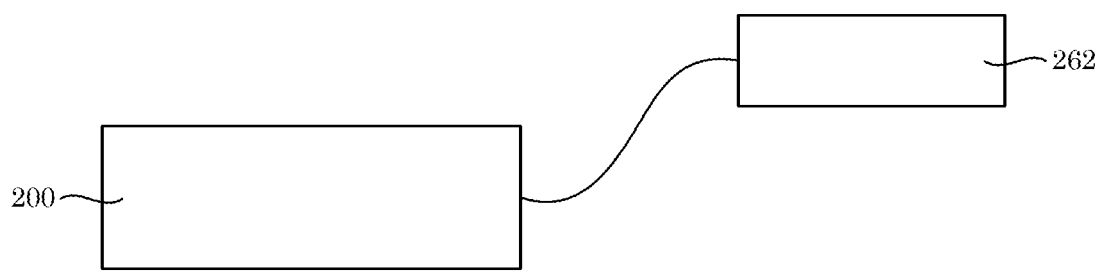
FIG. 5 shows a relative humidity sensor.

In an embodiment, with reference to FIG. 5, relative humidity sensor 260 includes photonic quantum dew point sensor 200 and secondary temperature sensor 262 in communication with photonic quantum dew point sensor 200.

Figure 6:
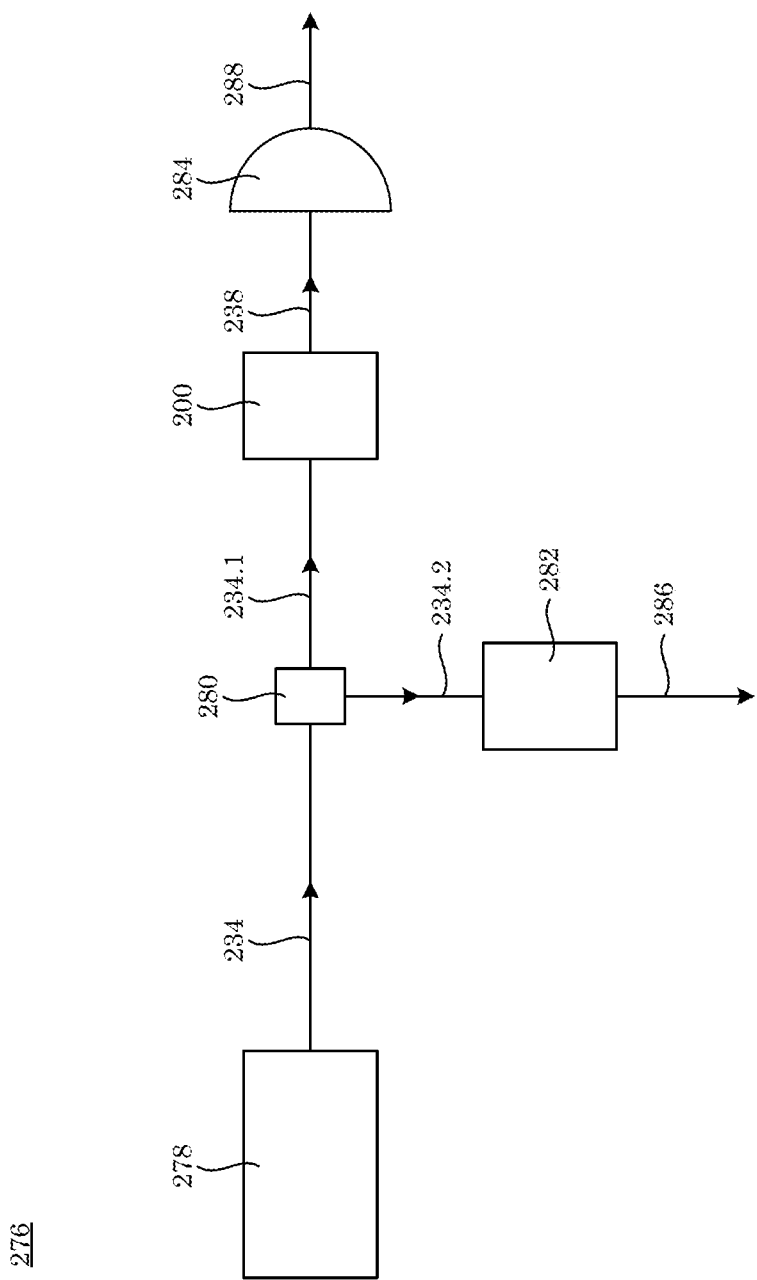
FIG. 6 shows a sensor system.

In an embodiment, with reference to FIG. 6, sensor system 276 includes laser 278 in optical communication with photonic quantum dew point sensor 200, wherein laser 278 provides primary light 234. Splitter 280 is optically interposed between laser 278 and photonic quantum dew point sensor 200 and optically splits primary light 234 from laser 278 into primary light 234.1 that is communicated from splitter 280 to photonic quantum dew point sensor 200; and primary light 234.2 that is communicated from splitter 280 to wavelength meter 282. Wavelength meter 282 receives primary light 234.2 and produces wavelength signal 286 from primary light 234.2. Photonic quantum dew point sensor 200 receives primary light 234.1, produces output light 238 from primary light 234.1, and communicates output light 238 to power meter 284 that produces power signal 288 from output light 238.

Figure 7:
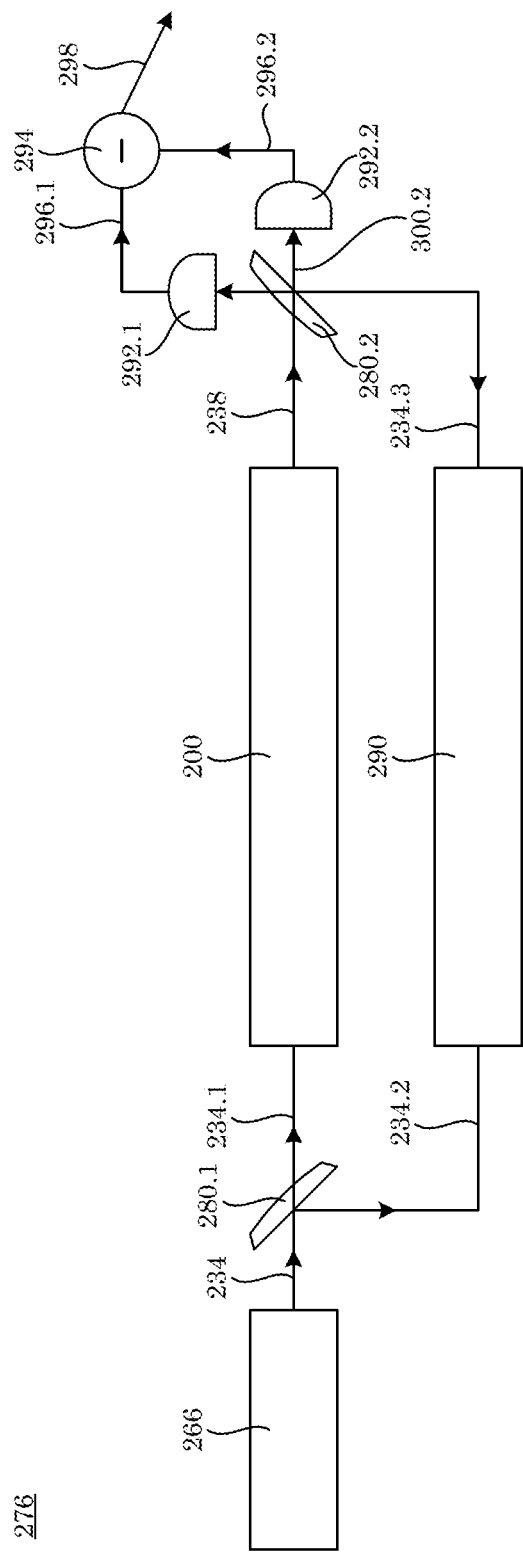
FIG. 7 shows a sensor system.

In an embodiment, with reference to FIG. 7, sensor system 276 includes laser 278 in optical communication with photonic quantum dew point sensor 200, wherein laser 278 provides primary light 234. Splitter 280.1 is optically interposed between laser 278 and photonic quantum dew point sensor 200 and optically splits primary light 234 from laser 278 into primary light 234.1 that is communicated from splitter 280.1 to photonic quantum dew point sensor 200; and primary light 234.2 that is communicated from splitter 280.1 to frequency shifter 290. Frequency shifter 290 receives primary light 234.2 and produces shifted primary light 234.3 from primary light 234.2. Photonic quantum dew point sensor 200 receives primary light 234.1, produces output light 238 from primary light 234.1, and communicates output light 238 to splitter 280.2. Splitter 280.2 receives output light 238 from photonic quantum dew point sensor 200 and shifted primary light 234.3 from frequency shifter 290; produces combined light 300.1 that is received by detector 292.1; and produces combined light 300.2 that is received by detector 292.2. Detector 292.1 produces frequency signal 296.1 from combined light 300.1, and detector 292.2 produces frequency signal 296.2 from combined light 300.2. Heterodyne receiver 294 is in electrical communication with detector 292.1 and detector 292.2; receives frequency signal 296.1 and frequency signal 296.2; and produces receiver signal 298 from frequency signal 296.1 and frequency signal 296.2.

In photonic quantum dew point sensor 200, common substrate 226 can include a material that can be processed (e.g., micromachined, including lithography and the like) to form a support structure for dew sensor substrate (e.g., 216) and temperature sensor substrate (e.g., 218). Exemplary substrates 226 include wafers or dies of silicon, sapphire, silicon carbide or III-V materials. A thickness of common substrate 226 can be from 100 µm to 10 mm, specifically from 250 µm to 1 mm, and more specifically from 550 µm to 680 µm. In an embodiment, common substrate 226 includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, common substrate 226 is a compound semiconductor such as SiC, SiGe, GaN; a group 13-15 (also referred to as a group III-V) semiconductor such as AlSb, AlAs, AlN, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

Common substrate 226 also can include a supplemental element such as C, H, N, Li, Na, K, Mg, Ca, Sr, Ba, Bi, B, Al, P, S, O, and the like in an amount typically less than an amount of the semiconductor. In an embodiment, common substrate 226 includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, substrate 226 includes an n-dopant. In a particular embodiment, common substrate 226 is p-doped Si. In one embodiment, common substrate 226 is n-doped Si. Common substrate 226 can be produced from, e.g., commercially available semiconductor grade p-doped Si having a particular crystalline orientation, e.g., having Miller indices <111>, <100>, and the like. Common substrate 226 can be amorphous, polycrystalline, or a single crystal. In an embodiment, common substrate 226 has a stacked structure that includes a plurality of semiconductor layers such as by forming films as SiGe/Si/SiGe/Si on a Si substrate. In some embodiments, common substrate 226 includes crystalline domains among amorphous material.

In another embodiment, common substrate 226 includes a glass, Pyrex, sapphire, polymer, ceramic, or an electrically conductive material, e.g., a metal. The substrate can be electrically conductive, semi-conductive, or electrically insulating.

A thermal conductance of common substrate 226 can be selected by choice of a composition of common substrate 226 as well as a geometrical shape or size of common substrate 226. A thermal conductivity of common substrate 226 can be from 0.1 to 5000 W/mK, specifically from 0.5 W/mK to 100 W/mK and more specifically from 1 W/mK to 5 W/mK In photonic quantum dew point sensor 200, dew sensor substrate 216 can be disposed on common substrate 226 to isolate dew sensor 210 from common substrate 226. In an embodiment, the dielectric layer insulates dew sensor substrate 216 from common substrate 226. The dielectric layer can include an oxide of an element in dew sensor substrate 216 or independently can be an oxide of a semiconductor material such as $SiO_2$. According to an embodiment, the dielectric layer is an oxide such as an oxide that includes an element from dew sensor substrate 216, e.g., an oxide of the semiconductor (also referred to herein as a semiconductor oxide). In an embodiment, dew sensor substrate 216 includes Si, and dielectric layer 323 includes silicon dioxide ($SiO_2$). Additional dielectric layer materials include gallium oxide ($GaO_3$), aluminum oxide ($Al_2O_3$), or alloys thereof, oxides of compounds from Groups III and V or alloys thereof, and the like. Exemplary oxides in the dielectric layer also include ZnO, $HfO_2$, $SnO_2$, $In_2O_3$, $Zn_2SnO_4$, $Ga_2O_3$, $Al_2O_3$, and the like. In an embodiment, the dielectric layer is a product of oxidation of a portion of dew sensor substrate 216 to produce the semiconductor oxide. According to one embodiment, the oxide is a product of rapid thermal oxidation of dew sensor substrate 216 so that the oxide (the dielectric layer) is derived from dew sensor substrate 216. In another embodiment, the oxide is a product of low temperature oxidation of dew sensor substrate 216 to produce an oxide. In a further embodiment, the oxide is a product of depositing the oxide on dew sensor substrate 216, which may or may not involve oxidation of dew sensor substrate 216. Moreover, the dielectric layer may be bonded to the dew sensor substrate 216. In a certain embodiment, the dielectric layer includes $SiO_2$ as the oxide, which is a product of oxidation of dew sensor substrate 216 that includes Si. In some embodiments, the dielectric layer includes a semiconductor oxide, a ceramic (e.g., $ZrO_2$, $Al_2O_3$, SiC, $Si_3N_4$, BN, $BaTiO_3$, and the like), a glass, a polymer, or a combination thereof. In some embodiments, the dielectric layer includes an organic compound such as a polymer, e.g., cellulose, poly(methyl methacrylate), and the like.

A thickness of dew sensor substrate 216 between photonic dew sensor 210 and common substrate 226 can be from 0.25 µm to 10 µm, specifically from 0.5 µm to 5 µm, and more specifically from 1 µm to 3 µm. A thermal conductivity of dew sensor substrate 216 can be from 0.1 W/mK to 1000 W/mK, specifically from 0.5 W/mK to 100 W/mK, and more specifically from 1 to 5 W/mK.

In photonic quantum dew point sensor 200, temperature sensor substrate 218 can have the same composition, properties and function as dew sensor substrate 216.

In photonic quantum dew point sensor 200, heater 230 can include a resistive element to deposit heat into the dew sensor substrate 216 and can be composed of metal or a doped or undoped semiconductor. Exemplary heaters 230 include a film of n- or p-type doped Si, a metal film of aluminum, gold, platinum or chromium, and the like. Heater 230 can provide heat to photonic dew sensor 210 to heat photonic dew sensor 210 by an amount from 0.1° C. to 200° C., specifically from 1° C. to 100° C., and more specifically from 10° C. to 50° C. A size (e.g., a longest linear dimension) of heater 230 can be from 1 μm to 1 mm, specifically from 10 μm to 500 μm, and more specifically from 100 μm to 200 μm. Moreover, the thickness of the heater 230 can be from 10 nm to 10 μm, and more specifically from 100 nm to 2 μm. In an embodiment, heater 230 includes Pt or Cr film of 200 nm thickness and 50 μm in the longest linear dimension.

Sensor cover 220 can include a sealed membrane or cap to isolate photonic temperature sensor 212 and optomechanical temperature sensor 214 and can be an impervious material that prevents the analyte from reaching each of photonic temperature sensor 212 and optomechanical temperature sensor 214. Exemplary sensor covers 220 include silicon, silicon dioxide and borosilicate glass. Moreover, the sensor may incorporate a metal film or polyimide film deposited over silicon dioxide, borosilicate glass, and the like. A size (e.g., a longest linear dimension) of sensor cover 220 can be from 2 μm to 1000 μm, specifically from 5 μm to 500 μm, and more specifically from 10 μm to 100 μm. Cavity 222 is a spacing between sensor cover 220 and each of photonic temperature sensor 212 and optomechanical temperature sensor 214. Cavity 222 can be a spacing from 0.2 μm to 100 μm, specifically from 0.5 μm to 25 μm, and more specifically from 1 μm to 10 μm. In an embodiment, sensor cover 220 includes a layer of silicon dioxide deposited over temperature sensor 212 and optomechanical temperature sensor 214 by plasma-enhanced chemical vapor deposition (PE-CVD). In another embodiment, sensor cover 220 includes borosilicate wafer bonded to temperature sensor substrate 218 over cavity 222.

Photonic dew sensor 210, photonic temperature sensor 212, and optomechanical temperature sensor 214 independently include waveguide 232 to guide light along a path and can be a structure on or over a substrate which transmits light along the axial direction and confines it in the transverse directions. Exemplary waveguides 232 include rib waveguides and ridge waveguides. Moreover, the waveguide may contain coupling elements to bring light into and out of the waveguide, such as Bragg couplers or inverse tapers. A size, i.e., a transverse cross-section dimension relative to a propagation path of primary light 234 in waveguide 232, can be from 20 nm to 20 μm, specifically from 50 nm to 5 μm, and more specifically from 200 nm to 1 μm. A transmission loss of waveguide 232 can be from 0.1 dB/cm to 50 dB/cm, specifically from 0.5 dB/cm to 10 dB/cm, and more specifically from 1 dB/cm to 4 dB/cm at a wavelength from 500 nm to 10 μm, specifically from 750 nm to 4 μm, and more specifically from 1 μm to 2.5 mm. In an embodiment, waveguide 232 includes guides light along a path; can have dimensions from 300 nm to 1 μm width, 200 nm to 500 nm height; can include silicon and similar materials; and can operate at a wavelength from 1 μm to 2.5 μm.

Photonic dew sensor 210, photonic temperature sensor 212, and optomechanical temperature sensor 214 independently include resonator 236 that independently can include a structure with narrow width temperature dependent, frequency dependent dispersion to measure temperature and can be a photonic structure exhibiting this property. Exemplary resonators 236 include ring resonator 246, disk resonator 248, photonic crystal 250, Bragg waveguide 252, photonic nanobeam 244 over trench 240, and the like. A size of a width, i.e., a transverse cross-section dimension relative to a propagation path of primary light 234 in resonator 236, can be from 20 nm to 10 μm, specifically from 50 nm to 5 μm, and more specifically from 200 nm to 1 μm. A size for a thickness, i.e., a transverse cross-section dimension relative to a propagation path of primary light 234 in resonator 236, can be from 50 nm to 5 μm, specifically from 100 nm to 3 μm, more specifically form 200 nm to 1 μm. The optical resonator and waveguide independently can be made from a same or different material as the substrate. In some embodiments, the optical resonator includes sapphire, silicon, silica, silicon nitride, diamond, silicon carbide, group III-V semiconductors, or a combination thereof. Exemplary group III-V semiconductors include AN, GaN, InN, TlN, BP, AlP, GaP, InP, TlP, BAs, AlAs, GaAs, InAs, TlAs, BSb, AlSb, GaSb, InSb, TlSb, BBi, AlBi, GaBi, InBi, TlBi, or a combination thereof. The material for forming the optical resonator can be selected based on a resonant wavelength for the optical resonator, e.g., silicon for devices a resonant frequency in a near infrared region (e.g., up to 2 μm wavelength), silicon nitride or aluminum nitride for a visible wavelength, sapphire for a terahertz wavelength, and the like.

The resonant frequency of the optical resonator includes a wavelength from 200 nm to 10 μm, specifically 400 nm to 3 μm, and more specifically 500 nm to 2 μm. The output light of the thermometer includes a reduced transmission of the resonant frequency with respect to the input light. A free spectral range of the optical resonator is greater than 0.001 nm and specifically from 0.1 nm to 20 nm. A bandwidth of the optical resonator is from 0.0001 nm to 1 nm. A quality factor (Q-factor) of the optical resonator is from 1 to $10^6$ and specifically from 100 to 100,000. It is contemplated that the optical resonator can have an increased Q-factor by including a Bragg waveguide.

Ring resonator 246 is an is an optical resonator that includes a ring structure separated from waveguide 234. A size, i.e., a transverse cross-section dimension relative to a propagation path of primary light 234 in ring resonator 246, can be from 50 nm to 10 μm, specifically from 100 nm to 5 μm, and more specifically from 500 nm to 2.5 μm. A ring resonator radius can be from 1 μm to 1 mm, specifically, from 2 μm to 500 μm, more specifically from 5 μm to 50 μm. The separation of the ring resonator 246 from the waveguide 246 can be from 20 nm to 3 μm, specifically, from 50 nm to 1 μm, more specifically, from 100 nm to 500 nm. In an embodiment, ring resonators 246 has a radius of 10 μm with transverse dimensions 220 nm in height and 600 nm in width and is separated from waveguide 234 by 130 nm. Moreover, the ring resonator has a free spectral range of 9.2 nm at 1550 nm, Q-factor of 50000, and estimated group index of 4.2.

Disk resonator 248 is an optical resonator comprising a disc structure that is separated from waveguide 234. A thickness of a disk resonator 248, can be from 50 nm to 5 μm, specifically from 100 nm to 3 μm, more specifically form 200 nm to 1 μm. A radius of a disk structure can be from 1 μm to 1 mm, specifically, from 2 μm to 500 μm, more specifically from 5 μm to 50 μm. The separation of the disk resonator 248 from the waveguide 234 can be from 20 nm to 3 μm, specifically, from 50 nm to 1 μm, more specifically, from 100 nm to 500 nm.

Photonic crystal 250 can include periodic or aperiodic perturbation of an effective index of refraction through apertures of different shape disposed therein. In some embodiments, a plurality of apertures 306 is distributed along a length axis of a photonic crystal 250. In certain embodiments, the plurality of apertures 306 have a diameter of the same size. In an embodiment, some of the plurality of apertures 306 have different size diameters. According to an embodiment, the plurality of apertures 306 have different size diameters such that apertures 306 are arranged symmetrically with respect to the center of photonic crystal 250 with largest diameter apertures 306 located proximate to waveguide 232 and smallest diameter apertures 306 located distal to waveguide 232. Exemplary photonic crystals 250 include apertures circular in shape disposed therein. The size of apertures can be from 20 nm to 3 µm, specifically from 50 nm to 1 µm, more specifically from 100 nm to 800 nm. The depth of apertures can be equal or less than the thickness of the waveguide. A size, i.e., a transverse cross-section dimension relative to a propagation path of primary light 234 in photonic crystal 250, can be from 50 nm to 10 µm, specifically from 100 nm to 5 µm, and more specifically from 500 nm to 2.5 µm. In an embodiment, photonic crystal 250 includes circular apertures of diameters ranging from 100 nm to 270 nm, aperture depth of 220 nm, and aperture period of 335 nm.

Bragg waveguide 252 can include a periodic (as shown on FIG. 2D) or aperiodic perturbation of an effective index of refraction in optical resonator 236. In an embodiment, the perturbation causes reflection of light (propagating in Bragg waveguide 252) for a wavelength of light that satisfies a Bragg condition. Light at other wavelengths that does not satisfy the Bragg condition is substantially unaffected by Bragg waveguide 252. Exemplary Bragg waveguides 252 include square wave modulation of the width of waveguide 232 with modulation period ranging from 50 nm to 5 µm, specifically from 100 nm to 2.5 µm, more specifically from 200 nm to 1 µm. Moreover, the modulation width depth can be from 10 nm to 2 µm, specifically from 20 nm to 500 nm, more specifically from 50 nm to 100 nm. A size, i.e., a transverse cross-section dimension relative to a propagation path of primary light 234 in Bragg waveguide 252, can be from 50 nm to 10 µm, specifically from 100 nm to 5 µm, and more specifically from 500 nm to 2.5 µm. In an embodiment, Bragg waveguide 252 includes.

Photonic nanobeam 244 can include periodic or aperiodic perturbation of an effective index of refraction through apertures of different shape disposed therein. Photonic nanobeam 244 can be disposed on a substrate. Photonic nanobeam 244 can also be suspended over a trench. In some embodiments, a plurality of apertures is distributed along a length axis of a photonic nanobeam 244. In certain embodiments, the plurality of apertures has a diameter of the same size. In an embodiment, some of the plurality of apertures have different size diameters. According to an embodiment, the plurality of apertures has different size diameters such that apertures are arranged symmetrically with respect to the center of photonic nanobeam 244 with largest diameter apertures located proximate to waveguide 232 and smallest diameter apertures located distal to waveguide 232. Exemplary photonic nanobeam 244 include apertures circular in shape disposed therein. The size of apertures can be from 20 nm to 3 µm, specifically from 50 nm to 1 µm, more specifically from 100 nm to 800 nm. The depth of apertures can be equal or less than the thickness of the waveguide. A size, i.e., a transverse cross-section dimension relative to a propagation path of primary light 234 in photonic nanobeam 244, can be from 50 nm to 10 µm, specifically from 100 nm to 5 µm, and more specifically from 500 nm to 2.5 µm. In an embodiment, photonic nanobeam 244 includes circular apertures of diameters ranging from 100 nm to 270 nm, aperture depth of 220 nm, and aperture period of 335 nm.

Photonic nanobeam 244 is disposed and suspended over trench 240 that is disposed in temperature sensor substrate 218 and bounded by wall 242. A size, e.g., a longest linear dimension and smallest linear dimension, of trench 240 can be from 500 nm to 2 mm, specifically from 1 µm to 200 µm, and more specifically from 10 µm to 50 µm. The depth of trench 240 can be from 500 nm to 1 mm, specifically from 1 µm to 200 µm, more specifically from 2 µm to 20 µm. In an embodiment, trench 240 has depth of 3 µm, shortest linear dimension of 10 µm, and longest linear dimension of 50 µm.

Primary light 234 can include light from laser 278 transmitted to waveguide 232. Exemplary primary light 234 can be light emitted from diode, an arc lamp, an infrared laser, a visible laser, an ultraviolet laser, and the like. Moreover, in the embodiment, primary light 234 is emitted from a C-band tunable laser. A wavelength of primary light 234 can be from 200 nm to 10 µm, specifically 400 nm to 3 µm, and more specifically 500 nm to 2 µm. A power of primary light 234 can be from 10 nW to 100 mW, specifically from 50 nW to 50 mW, and more specifically from 100 nW to 10 mW. In an embodiment, primary light 234 includes light from C-band tunable laser in a wavelength range from 1520 nm to 1570 nm and laser power from 0.1 mW to 20 mW.

Output light 238 can include light transmitted along waveguide 232 with a reduced transmission at the resonant frequency of the resonator 236. A wavelength of output light 238 can be from 200 nm to 10 µm, specifically 400 nm to 3 µm, and more specifically 500 nm to 2 µm. A power of output light 238 can be from 10 nW to 100 mW, specifically from 50 nW to 50 mW, and more specifically from 100 nW to 10 mW. In an embodiment, output light 238 includes light from C-band tunable laser in a wavelength range from 1520 nm to 1570 nm and laser power from 0.1 mW to 20 mW which has passed through the dew sensor 200.

Thermoelectric member 254 can include a Peltier element to transfer heat into or out of thermal conductor 256 and can move heat from one of its faces to the other. Exemplary thermoelectric members 254 include bulk Peltier module and planar Peltier module. Thermoelectric member 254 can remove heat from common substrate 226 to cool photonic dew sensor 210 by from 1° C. to 100° C., specifically from 10° C. to 80° C., and more specifically from 40° C. to 70° C. A size (e.g., a longest linear dimension) of thermoelectric member 254 can be from 0.1 mm to 100 mm, specifically from 1 mm to 20 mm, and more specifically from 3 to 10 mm. In an embodiment, thermoelectric member 254 includes a bulk Peltier cooling stage with wire leads soldered in place and with a metalized cold-plate surface. In another embodiment, thermoelectric member 254 includes a Peltier cooling stage fabricated by thin-film or thick-film techniques. In yet another embodiment, thermoelectric member 254 includes a planar Peltier cooling stage.

Cooling member 258 can include compressed gas confined to channels and one or more orifices through which the gas may expand to provide cooling and can be made from a material that is formed or machined such as silicon, glass, metal, and the like. Exemplary cooling members 258 include micromachined Joule-Thomson cryocoolers. Cooling member 258 can remove heat from dew sensor substrate 216 to cool photonic dew sensor 210 to a temperature below the environment by up to from 1 C to 300 C, specifically from 10 C to 200 C, and more specifically from 50 C to 150 C. A size (e.g., a longest linear dimension) of cooling member 258 can be from 1 mm to 100 mm, specifically from 5 mm to 50 mm, and more specifically from 10 mm to 20 mm. In an embodiment, cooling member 258 includes a Joule-Thomson cryocooler micromachined from a silicon wafer with high pressure nitrogen gas introduced through tubing epoxied to the wafer and expelled into the environment through the orifices built into the structure.

Thermal conductor 256 can include a conductive material to allow heat to flow out of common substrate and into the cold-plate of the thermoelectric element 254 and can be a solid, a liquid, or a combination thereof such as a paste or emulsion. Exemplary thermal conductors 256 include solder, thermally conductive greases and thermally conductive epoxies. Thermal conductor 256 can provide heat transfer via thermal conduction from thermoelectric member 254 and common substrate 226 as well as from cooling member 258 and thermoelectric member 254. A size, e.g., a thickness of thermal conductor 256 between thermoelectric member 254 and common substrate 226 can be from 1 µm to 10 mm, specifically from 20 µm to 1 mm, and more specifically from 50 µm to 400 µm. In an embodiment, thermal conductor 256 includes pure metals such as indium or gallium, alloys such as gallium-indium-tin, silver loaded epoxy or thermally conductive grease.

In photonic quantum dew point sensor 200, secondary temperature sensor 262 can include a sensor element in thermal equilibrium with the environment to report the temperature of that environment and can be an element that reproducibly reports the environmental temperature. Exemplary secondary temperature sensors 262 thermistors, thermocouples, resistance thermometers, thermocouples, diode thermometers, liquid-in-glass-thermometers, photonic thermometers, acoustic thermometers, radiation thermometers, and colorimetric thermometers. In an embodiment, secondary temperature sensor 262 includes a wire-wound 100-ohm platinum resistance thermometer measured using an ohmmeter. In another embodiment, secondary temperature sensor 262 includes a ceramic thermistor measured using an ohmmeter. In yet another embodiment, secondary temperature sensor 262 includes a type K thermocouple measured using a voltmeter. In a further embodiment, secondary temperature sensor 262 includes a photonic thermometer similar in form and function to photonic temperature sensor 212.

Photonic dew sensor 210, photonic temperature sensor 212, optomechanical temperature sensor 214, secondary temperature sensor 262 independently attenuate primary light 234 in a wavelength dependent fashion, wherein a minimum power of transmitted light 238 occurs at the wavelength which is resonant with the resonator 236 in each of these components. Moreover, the resonant frequency of the resonator provides a measurement of the relevant quantity, such as the presence or absence of dew, or the temperature.

In photonic quantum dew point sensor 200, laser 278 can include a broadband source or a coherent light source with a narrow linewidth to provide primary light 234 to photonic dew sensor 210, photonic temperature sensor 212, or optomechanical temperature sensor 214 and can be a light emitting diode, an arc lamp, an infrared laser, a visible laser, an ultraviolet laser, and the like. Exemplary lasers 278 include tunable diode lasers. In an embodiment, laser 278 includes C-band tunable laser.

Presence of analyte 228 is detected by photonic dew sensor 210. Analyte 228 can include a fluid that exists as vapor that can be in equilibrium with its solid or liquid form at some characteristic pressure and temperature and can be either a pure fluid or a mixture of two or more fluids. Exemplary analytes 228 include water, a hydrocarbon, ammonia, and the like. Moreover, the analyte condenses on the dew sensor when the temperature of the dew sensor is below a characteristic temperature for the analyte when present in vapor form at some concentration. A dew point of analyte 228 can be from −120° C. to 95° C., specifically from −100° C. to 75° C., and more specifically from −90° C. to 45° C. at a temperature from −100° C. to 100° C., specifically from −70° C. to 80° C., and more specifically from −50° C. to 50° C. In an embodiment, analyte 228 includes water vapor which condenses as liquid or solid water on to the photonic dew sensor 210 when the temperature of the photonic dew sensor 210 is at or below the dew point of water corresponding to that concentration of water vapor.

Beam splitter 280 split or combine light. Exemplary splitters 280 include a waveguide-based splitter that couples incoming light flux propagating through an incoming waveguide to two or more outgoing light fluxes in two or more waveguides. Moreover, beam splitter 280 is optionally used to provide a portion of the light to a photodetector 272 and or a wavelength meter 270 and the like. In an embodiment, beam splitter 280 provides 10% of incident light from laser 278 to wavelength meter 270 and 90% of light incident from laser 278 is directed toward dew point sensor 210.

Wavelength meter 282 can include an element that determines wavelength of light incident on it. Exemplary wavelength meters 282 include diffraction grating, spectrometers, spectrum analyzer, an etalon, wavelength cell, and frequency combs. Moreover, the wavelength meter communicates the measured wavelength as an electronic or photonic signal. Wavelength meter 282 produces wavelength signal 286 that can include a voltage or other electric or photonic signal whose characteristics are determined by the measured wavelength and a specified calibration. Exemplary wavelength signals 286 include analog DC voltages, the frequency of AC voltages, DC electrical currents, microwave signals, and spectra dispersed by a diffraction grating. Moreover, wavelength meter 282 can determine the frequency light incident on it. In an embodiment, wavelength signal 286 analog DC voltage signal, and wavelength value displayed on a computer.

Power meter 284 can include an element to absorb incident light and another element to quantify the effect of this absorption, which is proportional to the amount of light absorbed. Exemplary power meters 284 include photodiodes and bolometers. Moreover, a device with a response that is proportional to the power of light incident upon it may be incorporated into a power meter. Power signal 288 produces power signal 288 that can include a voltage or other electric signal whose characteristics are determined by the measured wavelength and a specified calibration. Exemplary power signals 288 include DC voltages and DC currents. In an embodiment, power signal 288 includes a germanium-based photodiode, when a light is absorbed in the photodiode, an electron-hole pair is formed within the device, and a voltage is developed across the photodiode junction, measuring a photocurrent between photodiode terminals provides a measure of the optical power incident upon on a detector.

For balanced heterodyne detection in photonic quantum dew point sensor 200, frequency shifter 290 can include a modulator that shifts the oscillation frequency of a portion of primary light 234 and can be accompanied by additional optical filtering or amplification, or producing frequency shifted light can be accomplished by providing a separate laser system that operates at a frequency different from that of primary light 234. Frequency shifter 290 produces a laser beam, wherein some or all of the light oscillates at a frequency different from the oscillation frequency of primary light 234. Exemplary frequency shifters 290 include acousto-optic modulators and electro-optic modulators. Frequency shifter 290 can provide a frequency shift to primary light 234 to produce shifted primary light 234.3, wherein a shift in frequency can be from 1 kHz to 20 GHz, specifically from 1 MHz to 1 GHz, and more specifically from 1 MHz to 250 MHz. In an embodiment, frequency shifter 290 includes a fiber-coupled acousto-optic modulator driven by a frequency source at the selected frequency through which a portion of primary light 234 passes. Moreover, shifted primary light 234.3 can interact with output light 238 to produce combined light 300.1 and combined light 300.2. The light signals can be combined with optical element (280.2) that can include a beam splitter, a set of optical elements acting as a beam splitter, a fiber-optic coupler, or other combination of optical elements.

Detectors (292.1, 292.2) independently receive combined light (300.1, 300.2) from which is produced frequency signals (296.1, 296.2). Examples of detectors (292.1, 292.2) include InGaAs or Si photodiodes. Frequency signals (296.1, 296.2) occur at differences in oscillation frequencies of components of combined light (300.1, 300.2).

Receiver 294 receives frequency signals (296.1, 296.2) and can include electronic amplifiers, filters, transformers, and subtraction circuitry to produce receiver signal 298. Exemplary receivers 294 include differential amplifiers and transimpedance amplifiers. Receiver signal 298 can include information from amplitude and phase modulation on light that passed through dew point sensor 200. These modulations can arise from interaction of light with optomechanical temperature sensor 214 in dew point sensor 200. Receiver signal 298 can be processed with analog and digital signal processing to compute spectral features and correlations of the arising amplitude and phase modulations or a linear combination thereof to calculate the device temperature. Furthermore, measurements with different frequencies of shifted primary light 234.3 can be made to reduce dependence of the measurement on a frequency response of detectors (292.1, 292.2) or receiver 294.

Figure 8:
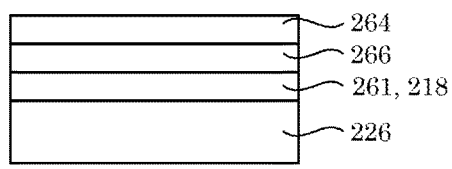
FIG. 8 shows structures formed in making a photonic quantum dew point sensor.
Figure 8:
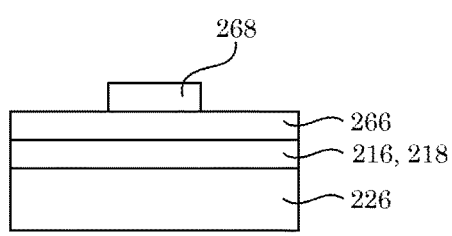
Figure 8:
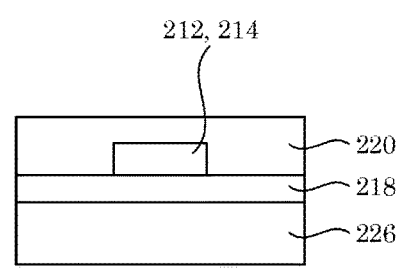
Figure 8:
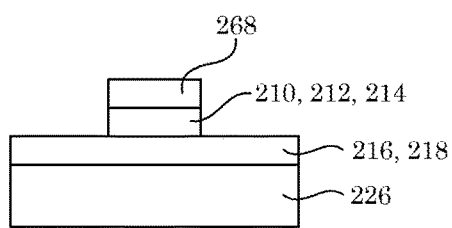
Figure 8:
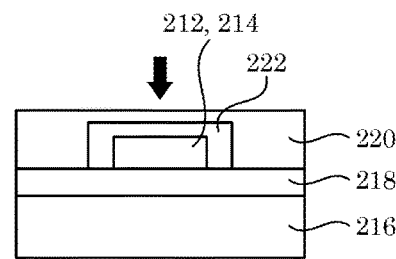
Figure 8:
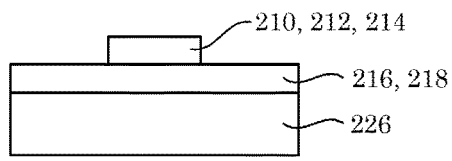

Photonic quantum dew point sensor 200 can be made in various ways. In an embodiment, with reference to FIG. 8, a process for making photonic quantum dew point sensor 200 includes: providing common substrate 226 (e.g., a silicon-on-insulator, silicon nitride-on-insulator, and the like) that includes silicon; forming an insulator layer (dew sensor substrate 216 and temperature sensor substrate 218) on common substrate 226 by thermal growth, chemical vapor deposition or plasma-enhanced chemical vapor deposition; forming device layer 266 (e.g., silicon, silicon nitride, and the like) on the insulator layer by smart cut, wafer bonding, thin film deposition, epitaxial growth; and forming resist layer 264 on device layer 266 by spin-coating on device layer 266 as shown in panel A of FIG. 8. As shown in panel B, resist mask 268 is made from resist layer 264 by lithography (e.g., photolithography, electron beam lithography, nanoimprint lithography). As shown in panel C, a portion of device layer 266 that is unprotected by resist mask 268 is etched, and a selected portion of device layer 266 forms sensor (210, 212, or 214) that is protected by resist mask 268. As shown in panel D, resist mask 268 is dissolved in a solvent to expose sensor (210, 212, or 214). Sensor cover 220 is formed by depositing an insulating layer such as silicon dioxide on sensor (212 or 214) as shown in panel E by chemical vapor deposition or plasma-enhanced chemical vapor deposition, atomic layer deposition, or as shown in panels F and G, by bonding sensor cover 220 with cavity 222 such that cavity 222 is aligned with photonic temperature sensor 212 and optomechanical temperature sensor 214 before bonding. Bonding can be performed by wafer bonding sensor cover 220 to temperature sensor substrate 218 by laser welding of a glass sinter, anodic bonding, thermal compression. Thermoelectric member 254 or cooling member 258 can be disposed on dew sensor substrate 216 by soldering to dew sensor substrate 216 or common substrate 220 if the bottom of the substrate is first metalized, or by epoxying to the bottom of the substrate. Secondary temperature sensor 262 can be disposed in communication a digital meter, microprocessor of other system that is also in communication with photonic quantum dew point sensor 200 to allow a measurement of relative humidity.

In an embodiment, with reference to FIG. 6, sensor system 276 includes light source 266 to provide input primary light 234 to photonic dew point sensor 200. Light source 278 is a broad band source (e.g., a lamp), a laser, or a combination thereof. Beam splitter 280 is optionally used to provide a portion of the input light to a wavelength meter 282 to measure the wavelength of the input light, a photodiode, a power meter, and the like. It is contemplated that a wavelength of the input is measured using, e.g., a wavelength meter, an etalon, a spectrometer, a wavelength cell, a spectrum analyzer, and the like. The other portion of light from laser 278 is directed to photonic dew point sensor 200. Output light from photonic dew point sensor 200 is sent to second detector 284, which is, e.g., a light detector such as a photo-diode, charge coupled device, semiconductor detector (e.g., InGaAs), photomultiplier tube, and the like.

In an embodiment, sensor system 276, as shown in FIG. 7, is made by assembling fiber optic components into a configuration described for elements (234, 280.1, 234.1, 234.2, 234.3, 290, 238, 280.2, 300.1, 300.2). Elements (300.1, 300.2) are connected to a balanced photoreceiver containing elements (292.1, 292.2, 296.1, 296.2, 294), which output signal 298 into an analog or digital electronics to compute the temperature.

Photonic quantum dew point sensor 200 has numerous advantageous and unexpected benefits and uses. Photonic dew sensor 210 has a property such as resonant frequency, quality factor, or transmission that changes with an amount of analyte 228 such as water present on a surface of photonic dew sensor 210. Photonic temperature sensor 212 has a property such as resonant frequency that changes with a change in temperature. Optomechanical temperature sensor 214 includes photonic nanobeam 244 suspended over trench 240, wherein an amplitude of a mechanical oscillation of photonic nanobeam 244 can be directly related to thermodynamic temperature and measured using a cavity-enhanced optical probe such as photonic crystal cavity, wherein optomechanical temperature sensor 214 can be a temperature standard as well as a sensor.

It is contemplated that dew sensor substrate 216 and temperature sensor substrate 218 can be fabricated on the same or different components in photonic quantum dew point sensor 200, wherein dew sensor substrate 216 and temperature sensor substrate 218 can be thermally bonded onto common substrate 226. Moreover, heater 230 is proximate to photonic dew sensor 210 so that a current passed through heater 230 locally heats photonic dew sensor 210 to desorb analyte 228 on photonic dew sensor 210.

Sensor (e.g., 210, 212, or 214) can be interrogated with wavelength scanning as shown in FIG. 6, wherein primary light 234 from tunable laser 278 is communicated to sensor (e.g., 210, 212, or 214). A fiber-coupled laser 278 can be used and fiber-coupled to an input port of waveguide 232. An output port of waveguide 232 can be fiber-coupled and connected to power meter 284. A power of output light 238 (e.g., a transmitted signal of primary light 234 from the sensor), is recorded from power meter 284 as power signal 288. A wavelength of primary light 234 can be simultaneously measured by wavelength meter 282. A fraction of primary light 234 from splitter 280 is communicated via an optical fiber to wavelength meter 282. Wavelength signal 286 and power signal 288 can be acquired from a communication interface such as an SMG connector and coaxial cabling. In this manner, a measured wavelength of some characteristic feature of device response, e.g., a wavelength measured when transmitted power is at a maximum can be determined. A value of wavelength of that feature depends on a presence of dew of analyte 228 or temperature, wherein photonic dew sensor 210 and photonic temperature sensor 212 sense temperature.

Optomechanical temperature sensor 214 can be subjected to heterodyne detection as shown in FIG. 7. Output light 238 and primary light 234.3 is detected in heterodyne by an optical local oscillator frequency, shifted by frequency shifter 290 that can be fiber-coupled between laser 278 and optomechanical temperature sensor 214.

Figure 9:
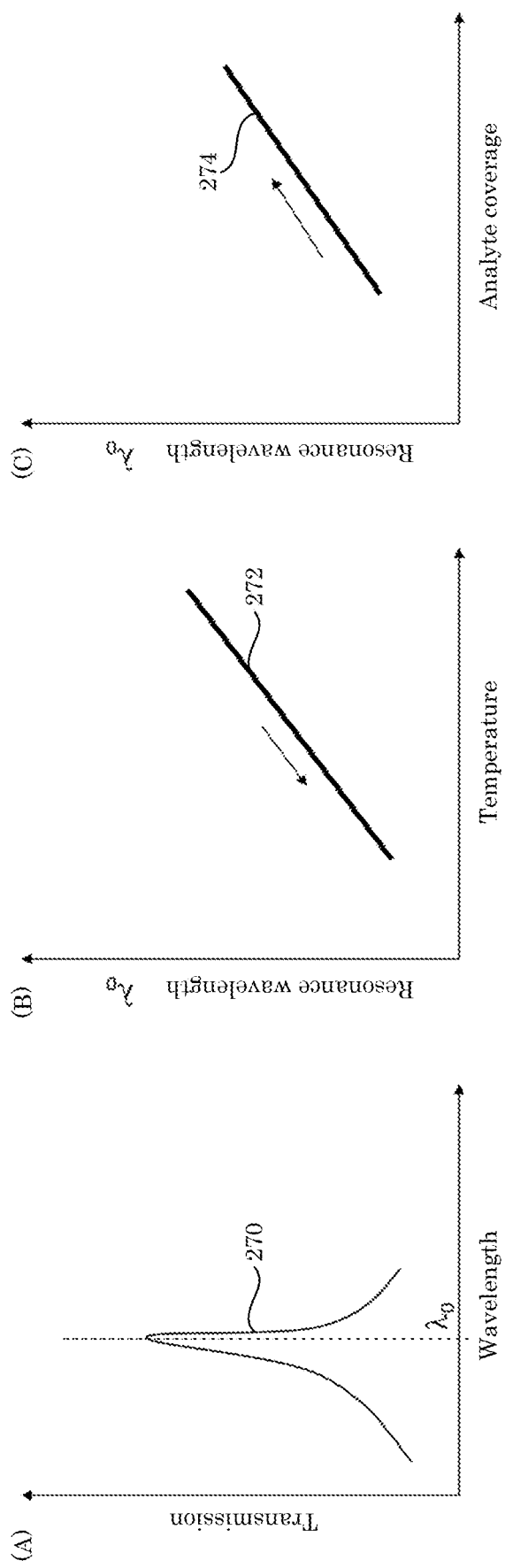
FIG. 9 shows, in panel A, a graph of transmission versus wavelength for a transmission spectrum; in panel B, a graph of resonance wavelength versus temperature for a temperature curve; and in panel C, a graph of resonance wavelength versus analyte coverage for a dew curve.

Regarding a response of photonic dew sensor 210 and photonic temperature sensor 212, optical responses can be acquired from wavelength signal 286 and power signal 288 respectively from wavelength meter 282 and power meter 284 to determine transmission spectrum 270, temperature curve 272, or dew curve 274 as shown in FIG. 9. Panel A shows transmission spectrum 270 for photonic dew sensor 210, photonic temperature sensor 212, or optomechanical temperature sensor 214. Resonance wavelength, $\lambda 0$, corresponding to a peak center in transmission spectrum 270 is determined. Panel B shows a temperature curve 272 for a dependence in temperature of $\lambda 0$ in absence of condensation of analyte 228 on photonic dew sensor 210. As temperature is decreased, a positive thermo-optic coefficient results in a decrease of effective refractive index and a decrease of resonance wavelength. Panel C show dew curve 274 for dependence of resonance wavelength $\lambda 0$ when analyte 228 accumulates on photonic dew sensor 210 at a fixed temperature. An increasing layer of analyte 228 on photonic dew sensor 210 increases an effective refractive index of photonic dew sensor 210. As a result, resonance wavelength $\lambda 0$ increases as the coverage of analyte 228 on photonic dew sensor 210 increases.

Figure 10:
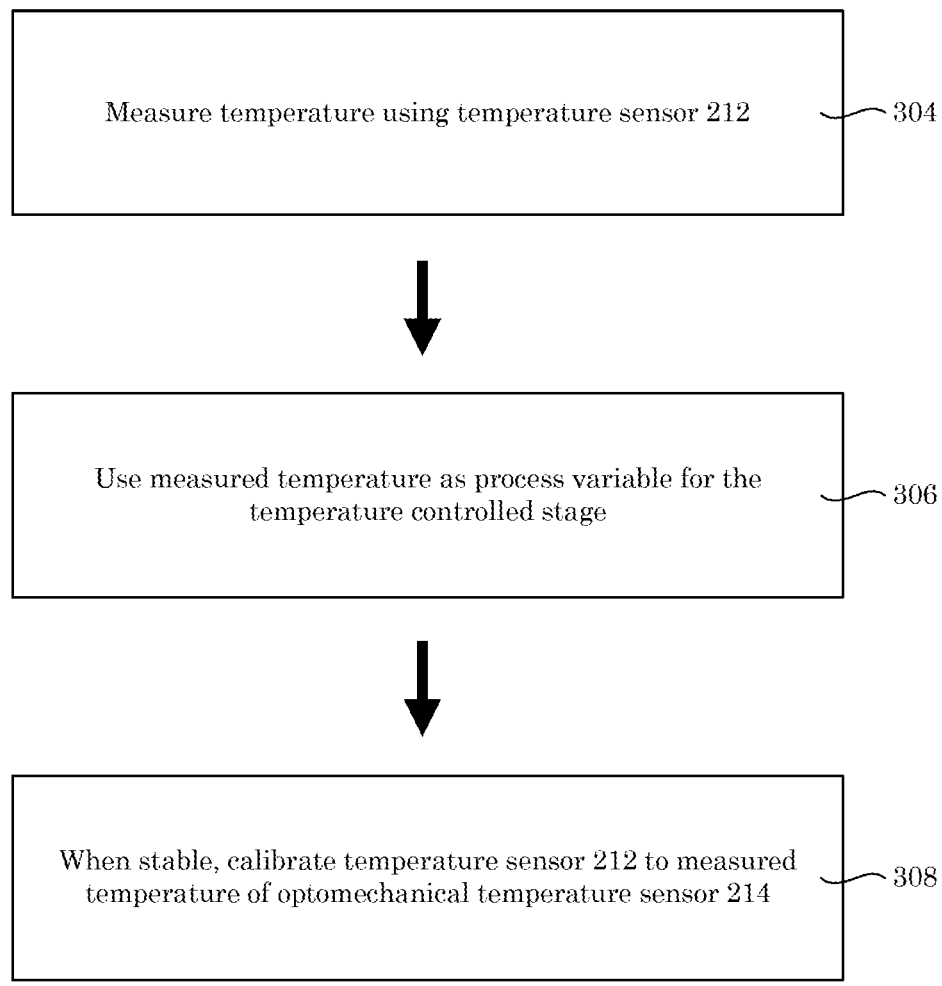
FIG. 10 shows steps in calibrating a photonic temperature sensor.

In an embodiment, with reference to FIG. 10, process 302 for calibrating photonic temperature sensor 212 includes stabilizing a temperature of photonic temperature sensor 212 by thermoelectric member 254 or cooling member 258 to stabilize, as substantially constant, resonant wavelength $\lambda 0$ of photonic temperature sensor 212. Output light 238 from optomechanical temperature sensor 214 is subjected to heterodyne detection, e.g., as shown in FIG. 7, wherein output light 238 is combined with frequency shifted light 290 to produced combined light 300.1 and 300.2, which are detected using detectors 292.1 and 292.2. That is, average spectral features or correlations of the detected light are computed to ascertain a scale of thermally excited, Brownian motion of the mechanical element and a fundamental scale of quantum noise in the optomechanical system. Using ratios of spectral features or correlations, the thermodynamic temperature is computed according to a fundamental governing equation. As a result, a primary measurement of thermodynamic temperature from optomechanical temperature sensor 214 is determined from which the temperature of photonic temperature sensor 212 is calibrated. Here, process 302 for calibrating can include measuring temperature with photonic temperature sensor 212 by measuring temperature induced wavelength shift (step 304); controlling a temperature of common substrate 226 by controlling a temperature of thermoelectric member 254 or cooling member 258 with the measured temperature of photonic temperature sensor 212 as a process control variable for thermoelectric member 254 or cooling member 258 (step 306); and, when the measured temperature of photonic temperature sensor 212 is stable, calibrating photonic temperature sensor 212 to measured temperature of optomechanical temperature sensor 214 (step 308). Calibration can be repeated at multiple different stable temperatures to increase the calibration accuracy over a range of temperatures.

Figure 11:
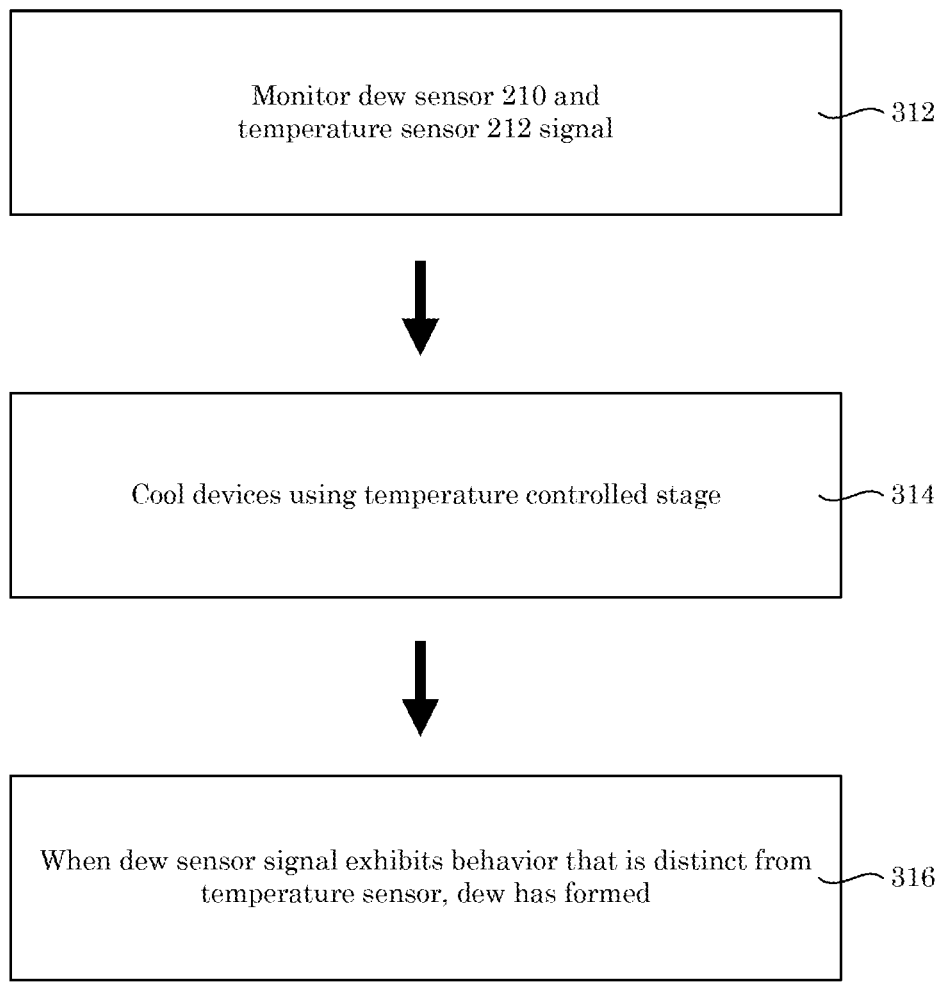
FIG. 11 shows steps in identifying onset of forming dew on a photonic dew sensor.

In an embodiment, with reference to FIG. 11, process 310 for determining an onset of formation of dew of analyte 228 is determined through measurements initiated above the dew point of analyte 228, wherein process 310 includes simultaneously monitoring the optical responses of photonic dew sensor 210 and photonic temperature sensor 212 (step 312); decreasing the temperature of common substrate 226, in thermal contact with photonic dew sensor 210 and photonic temperature sensor 212, with thermoelectric member 254 or cooling member 258 (step 314); determining a change in temperature of photonic dew sensor 210 and photonic temperature sensor 212 with temperature curve 272 by measuring temperature induced wavelength shift; and determining a change in photonic dew sensor 210 due to an amount of analyte 228 on photonic dew sensor 210 once the dew point of analyte 228 is reached (step 316). When the optical responses of photonic dew sensor 210 and photonic temperature sensor 212 diverge as determined by a sudden increase in the difference of the resonant frequencies of the photonic sensor and the photonic temperature sensor, dew of analyte 228 has formed on photonic dew sensor 210. A temperature at which the dew forms on photonic dew sensor 210 is the dew point of analyte 228.

Figure 12:
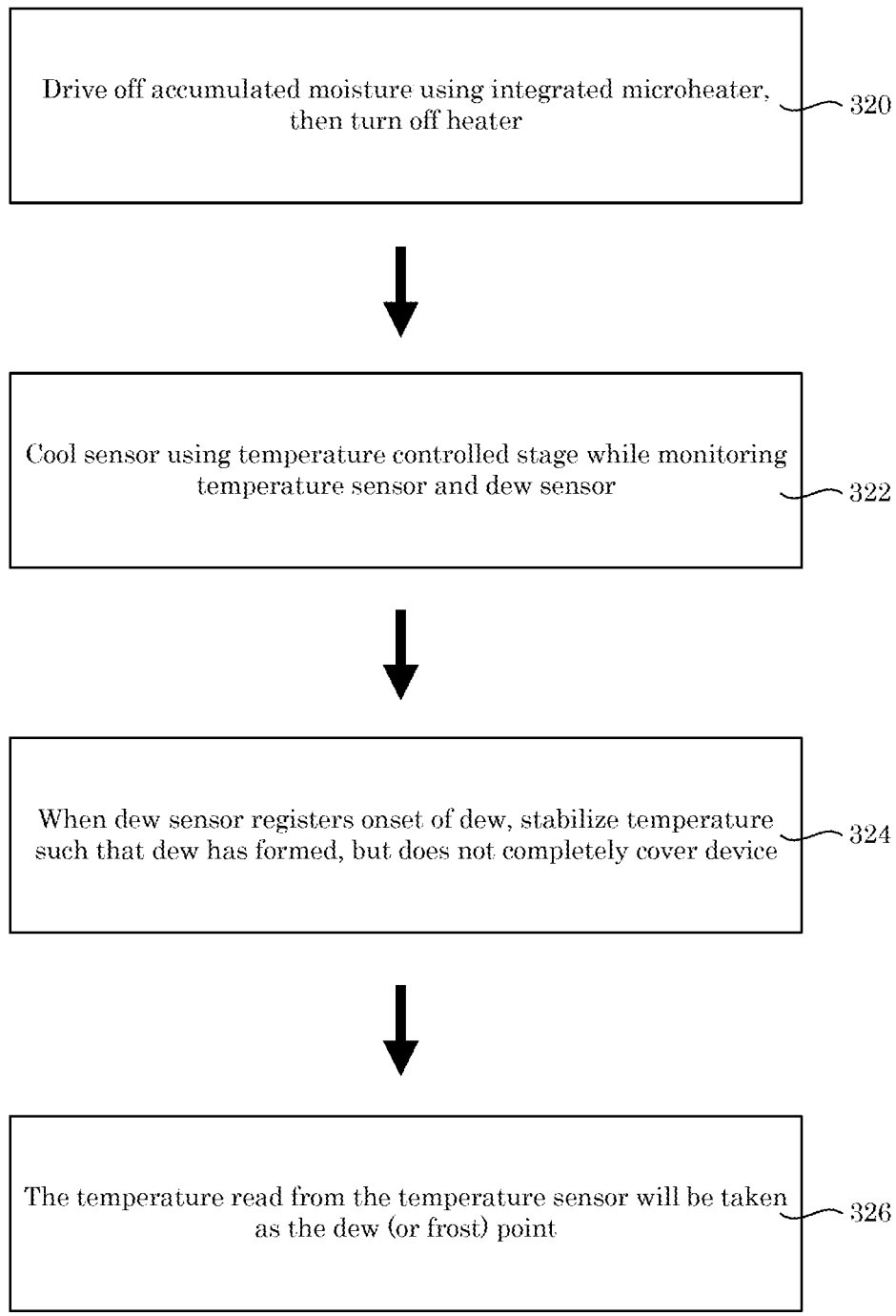
FIG. 12 shows steps in determining a dew point of an analyte.

In an embodiment, with reference to FIG. 12, process 318 for determining the dew point includes: removing moisture from photonic dew sensor 210 prior to determining the dew point of analyte 228, by heating photonic dew sensor 210 with heater 230 (step 320); terminating heating of photonic dew sensor 210 with heater 230; supplying electrical current to thermoelectric member 254 or supplying cooling fluid to cooling member 258 and cooling photonic dew sensor 210 and photonic temperature sensor 212 (step 322); monitoring the optical responses of photonic dew sensor 210 and photonic temperature sensor 212 (step 322); performing process 310 to determine when dew condenses; when dew condenses, terminating cooling and actively controlling thermoelectric member 254 and cooling member 258 by a difference in the optical responses from photonic dew sensor 210 and photonic temperature sensor 212 as the process control variable to thermoelectric member 254 and cooling member 258 to stabilize temperature of thermoelectric member 254 and cooling member 258 at a temperature where moisture of analyte 228 is present on photonic dew sensor 210 but does not completely cover photonic dew sensor 210 (step 324); once the optical response from photonic temperature sensor 212 stabilizes, determining that temperature reading from photonic temperature sensor 212 as the measured dew point of analyte 228 (step 708).

Figure 13:
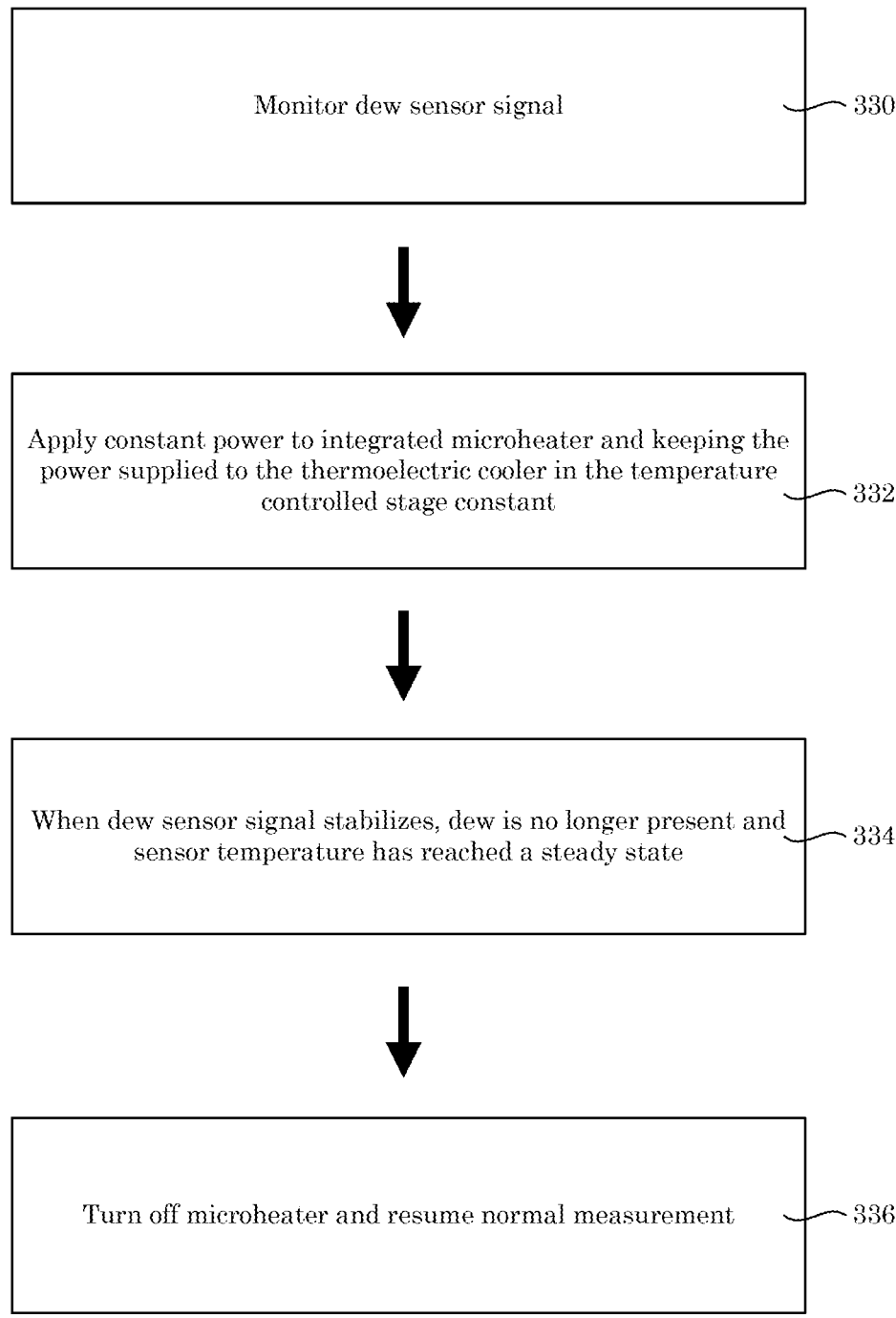
FIG. 13 shows steps in removing dew from a photonic dew sensor.

In an embodiment, with reference to FIG. 13, process 328 for removing dew from photonic dew sensor 210 includes achieving reliable and repeatable measurements of dew point by removing residual moisture from photonic dew sensor 210 before measuring the dew point of analyte 228 by heating photonic dew sensor 210 to a temperature greater than the temperature of the dew point with heater 230; monitoring output light 238 of photonic dew sensor 210 (step 330); maintaining power supplied to thermoelectric member 254 and cooling member 258 at a constant level before the removal cycle was initiated while maintaining electrical power to heater 230 at a constant level (step 904); obtaining a steady state of output light 238 of photonic dew sensor 210 (step 334) so that all dew of output light 238 is removed and the temperature of optomechanical temperature sensor 214 is stabilized; and terminating heating by heater 230 (step 336).

Figure 14:
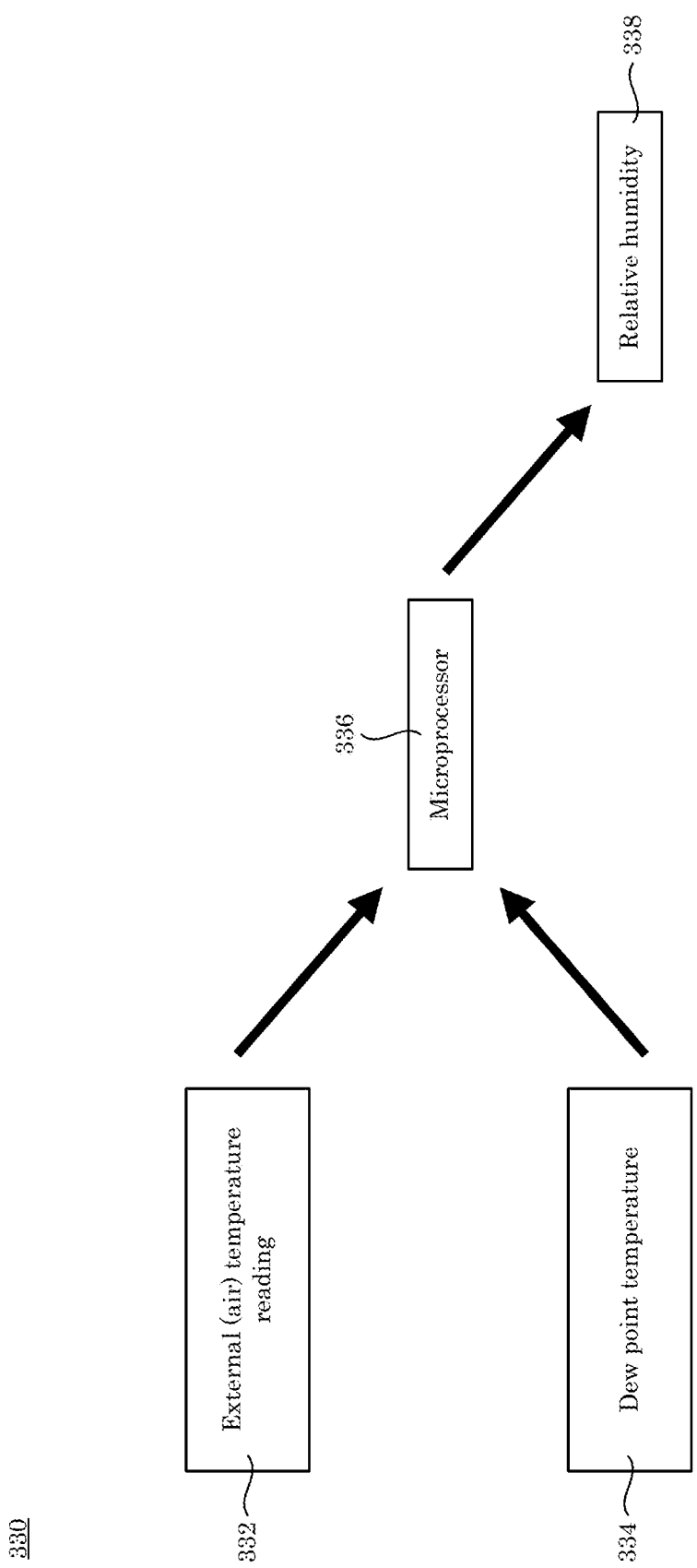
FIG. 14 shows steps in operating a relative humidity sensor.

In an embodiment, with reference to FIG. 14, process 330 for measuring relative humidity includes determining a temperature of the external environment such as the air surrounding photonic dew point sensor 200 by a secondary thermometer 262 (step 332); determining the dew point temperature of analyte with photonic dew point sensor 200; combining the dew point measurement and temperature of the external environment by reading both values into a microprocessor 318 (step 334); and determining a relationship between the air temperature and dew point by the known dew point—vapor pressure relationship, i.e., the coexistence curve of the analyte, (step 336) to determine the relative humidity by dividing the inferred analyte vapor pressure by the saturated analyte vapor pressure at the environmental temperature measured by secondary thermometer 262 (step 338).

Photonic quantum dew point sensor 200 and processes disclosed herein have numerous beneficial uses, including precise dew point measurement, rapid humidity measurement, and embedded sensing. Advantageously, photonic quantum dew point sensor 200 overcomes limitations of technical deficiencies of conventional articles such as slow response of conventional chilled-mirror dew point hygrometers, instability of capacitive and resistive hygrometers and the requirement of frequent calibration for all hygrometers. Further, the sensor is interrogated using photonic techniques, and it resists to electro-magnetic interference.

Moreover, photonic quantum dew point sensor 200 and processes herein have numerous advantageous properties. In an aspect, the small size of the sensor makes the sensor light and portable, allowing installation in locations with tight dimensional constraints. In another aspect, the solid state, impervious material from which photonic quantum dew point sensor 200 is constructed leads to a mechanically and chemically robust sensor compatible with use in a wide range of environments and conditions. In yet another aspect, the small size leads to low power requirements, allowing operation of the dew point sensor with less power dissipation that conventional dew point sensors.

Photonic quantum dew point sensor 200 is precise (provides relative humidity precision corresponding to dew point precision of about 0.1° C.), fast (provides a response time measured in seconds), and compact (includes sensors that are less than 1 cm in size).

Photonic quantum dew point sensor 200 and processes herein unexpectedly, by including a quantum temperature sensor 214 in dew point sensor 200, the dew point sensor may be installed permanently since it may be self-calibrated using this quantum temperature sensor 214. By ensuring traceability through on-chip calibration against quantum temperature sensor 214, dew point sensor 200 becomes embeddable in its measurement environment, during initial construction of that environment or anytime thereafter. Furthermore, embedded dew point sensors 200 may be combined into a distributed sensor network.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A photonic quantum dew point sensor for determining a dew point of an analyte, the photonic quantum dew point sensor comprising:
   a common substrate;
   a photonic dew sensor disposed on the common substrate and exposed for direct contact with the analyte;
   a photonic temperature sensor disposed on the common substrate;
   an optomechanical temperature sensor disposed on the common substrate;
   a dew sensor substrate disposed on the common substrate and interposed between the photonic dew sensor and the common substrate;
   a heater disposed on the dew sensor substrate proximate to the photonic dew sensor to heat the photonic dew sensor above a dew point of the analyte;
   a temperature sensor substrate disposed on the common substrate and interposed between the common substrate and each of the photonic temperature sensor and the optomechanical temperature sensor; and
   a sensor cover disposed on the photonic temperature sensor, the optomechanical temperature sensor, and the temperature sensor substrate to cover the photonic temperature sensor and the optomechanical temperature sensor to prevent direct contact between the analyte and each of the photonic temperature sensor and the optomechanical temperature sensor.

2. The photonic quantum dew point sensor of claim 1, wherein the photonic dew sensor comprises:
a waveguide that:
receives a primary light;
communicates the primary light to a resonator;
receives an output light from the resonator; and
communicates the output light; and
the resonator in optical communication with the waveguide and that:
receives the primary light from the waveguide;
produces the output light from the primary light; and
communicates the output light to the waveguide,
wherein an intensity of the output light is substantially lower than an intensity of the primary light when a wavelength of output light is at a resonance of the resonator.

3. The photonic quantum dew point sensor of claim 2, wherein the resonator comprises a ring resonator, a disk resonator, a photonic crystal, or a Bragg waveguide.

4. The photonic quantum dew point sensor of claim 2, wherein the resonator comprises photonic nanobeam disposed over a trench that is disposed in temperature sensor substrate and bounded by a wall of temperature sensor substrate.

5. The photonic quantum dew point sensor of claim 1, wherein the photonic temperature sensor comprises:
a waveguide that:
receives a primary light;
communicates the primary light to a resonator;
receives an output light from the resonator; and
communicates the output light; and
the resonator in optical communication with the waveguide and that:
receives the primary light from the waveguide;
produces the output light from the primary light; and
communicates the output light to the waveguide,
wherein an intensity of the output light is substantially lower than an intensity of the primary light when a wavelength of output light is at a resonance of the resonator.

6. The photonic quantum dew point sensor of claim 5, wherein the resonator comprises a ring resonator, a disk resonator, a photonic crystal, or a Bragg waveguide.

7. The photonic quantum dew point sensor of claim 1, wherein the optomechanical temperature sensor comprises:
a waveguide that:
receives a primary light;
communicates the primary light to a resonator;
receives an output light from the resonator; and
communicates the output light; and
the resonator in optical communication with the waveguide and that:
receives the primary light from the waveguide;
produces the output light from the primary light; and
communicates the output light to the waveguide,
wherein an intensity of the output light is substantially lower than an intensity of the primary light when a wavelength of output light is at a resonance of the resonator.

8. The photonic quantum dew point sensor of claim 1, further comprising:
a thermoelectric member disposed on the dew sensor substrate.

9. The photonic quantum dew point sensor of claim 8, further comprising:
a thermal conductor interposed between the dew sensor substrate and the thermoelectric member.

10. The photonic quantum dew point sensor of claim 9, further comprising:
a cooling member disposed on the thermoelectric member,
wherein a second thermal conductor is interposed between the coding member and the thermoelectric member.

11. A relative humidity sensor comprising:
the photonic quantum dew point sensor of claim 1; and
a secondary temperature sensor in communication with the photonic quantum dew point sensor.

12. The relative humidity sensor of claim 11, wherein the photonic dew sensor comprises:
a waveguide that:
receives a primary light;
communicates the primary light to a resonator;
receives an output light from the resonator; and
communicates the output light; and
the resonator in optical communication with the waveguide and that:
receives the primary light from the waveguide;
produces the output light from the primary light; and
communicates the output light to the waveguide,
wherein an intensity of the output light is substantially lower than an intensity of the primary light when a wavelength of output light is at a resonance of the resonator.

13. The relative humidity sensor of claim 12, wherein the resonator comprises a ring resonator, a disk resonator, a photonic crystal, or a Bragg waveguide.

14. The relative humidity sensor of claim 12, wherein the resonator comprises photonic nanobeam disposed over a trench that is disposed in temperature sensor substrate and bounded by a wall of temperature sensor substrate.

15. The relative humidity sensor of claim 11, wherein the photonic temperature sensor comprises:
a waveguide that:
receives a primary light;
communicates the primary light to a resonator;
receives an output light from the resonator; and
communicates the output light; and
the resonator in optical communication with the waveguide and that:
receives the primary light from the waveguide;
produces the output light from the primary light; and
communicates the output light to the waveguide,
wherein an intensity of the output light is substantially lower than an intensity of the primary light when a wavelength of output light is at a resonance of the resonator.

16. The relative humidity sensor of claim 15, wherein the resonator comprises a ring resonator, a disk resonator, a photonic crystal, or a Bragg waveguide.

17. The relative humidity sensor of claim 11, wherein the optomechanical temperature sensor comprises:
a waveguide that:
receives a primary light;
communicates the primary light to a resonator;
receives an output light from the resonator; and
communicates the output light; and
the resonator in optical communication with the waveguide and that:
receives the primary light from the waveguide;
produces the output light from the primary light; and
communicates the output light to the waveguide, wherein an intensity of the output light is substantially lower than an intensity of the primary light when a wavelength of output light is at a resonance of the resonator.

18. The relative humidity sensor of claim 11, further comprising:
   a thermoelectric member disposed on the dew sensor substrate.

19. The relative humidity sensor of claim 18, further comprising:
   a thermal conductor interposed between the dew sensor substrate and the thermoelectric member.

20. The relative humidity sensor of claim 19, further comprising:
   a cooling member disposed on the thermoelectric member,
   wherein a second thermal conductor is interposed between the cooling member and the thermoelectric member.

* * * * *